Figure 1:
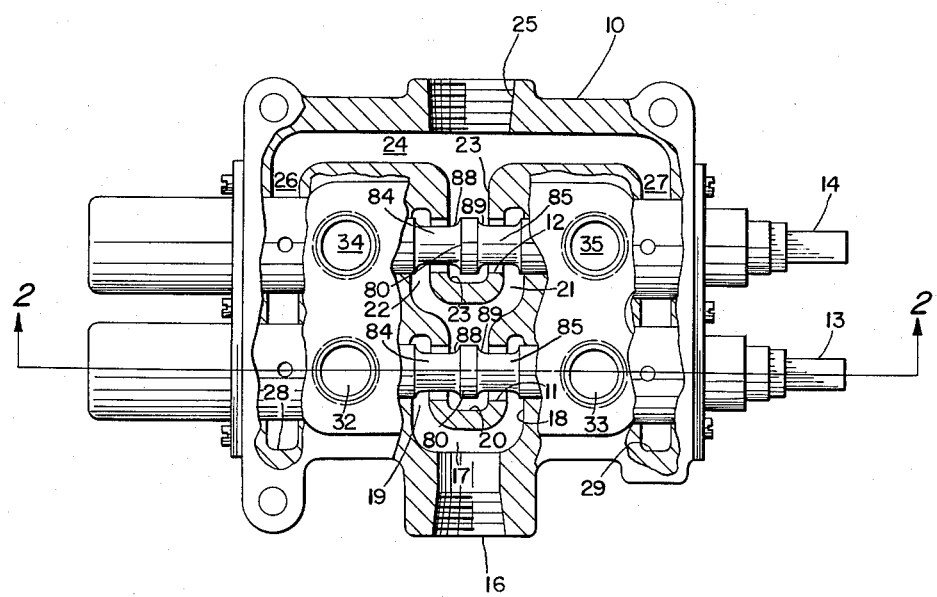

Dec. 26, 1961     W. T. STEPHENS     3,014,498
CONTROL VALVE FOR FLUID PRESSURE MOTORS
Filed Oct. 28, 1959     2 Sheets-Sheet 1

INVENTOR.
WILLIAM T. STEPHENS
BY John N. Wolfram
ATTORNEY

United States Patent Office 3,014,498
Patented Dec. 26, 1961

3,014,498
CONTROL VALVE FOR FLUID PRESSURE MOTORS
William T. Stephens, Racine, Wis., assignor to Parker-Hannifin Corporation, Cleveland, Ohio, a corporation of Ohio
Filed Oct. 28, 1959, Ser. No. 849,256
18 Claims. (Cl. 137—622)

This invention relates to control valves for fluid pressure operated motors and more particularly to valves of the sliding spool type.

In the operation of fluid pressure motors, such as cylinders from which a piston rod is extended or retracted for doing work upon another device, control valves are used for directing pressure fluid to one side or the other of the cylinders for effecting such extension or retraction of the piston rod. In one form of such valves, known as open center type, the valve, in its neutral position, also serves to divert flow of fluid directly from the pump back to the reservoir when it is not desired to operate the fluid pressure motor.

In such control valves it is desirable to provide check valves through which fluid being directed to the cylinder must travel, the purpose of the check valve being to maintain the position of the fluid motor piston rod against an external load during the time that it takes the pump to develop pressure in the system after the control valve has been moved from neutral position to the operating position. Without the check valves there is a momentary dropping of the load due to back flow of fluid from the cylinder to the control valve under pressure of the load after the control valve has been moved to operating position and before the fluid pressure from the pump has built up enough to sustain and further extend the load.

It is an object of the present invention to provide a control valve with load check valves of the type described in which the check valves are mounted directly on the valve spool and within the cylinder passage so as to simplify the passage arrangement through the valve housing and to provide a control valve of minimum bulk and weight.

It is another object to provide load check valves which are mounted on a relatively large diameter portion of the spool for maximum support thereof.

It is another object to provide load check valves which are supported by and have a slide fit with a portion of the spool which is made to close dimensional tolerances and to a high surface finish for other reasons, thus eliminating the necessity for providing additional close tolerance surfaces.

It is another object to provide a simplified structure for retaining such load checks in their proper position.

It is another object to provide means for biasing such load checks to closed position, which biasing means is also utilized for returning the spool valve to neutral position from its operating position.

Figure 2:
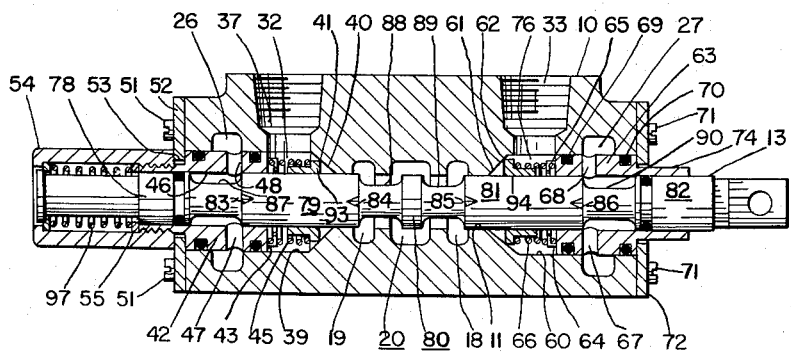
Figure 3:
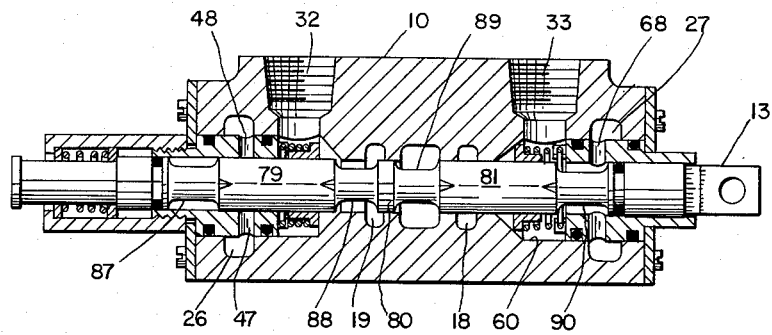
Figure 4:
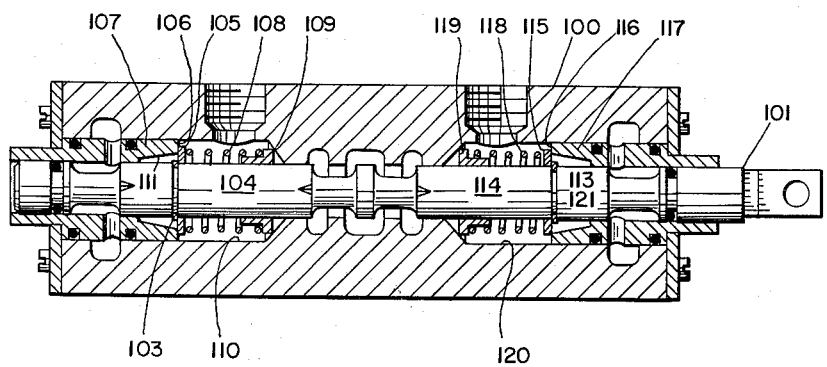
Figure 5:
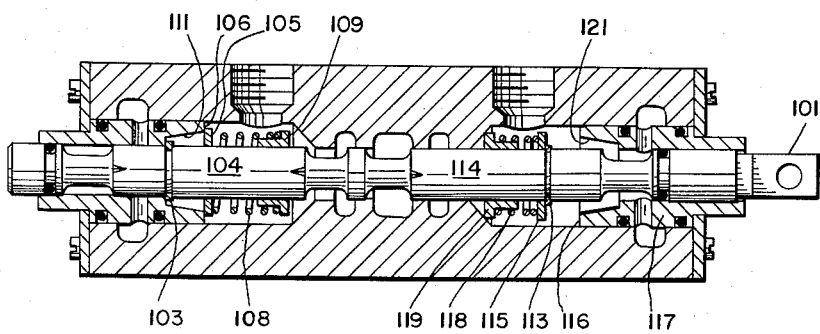

Other objects will be apparent from the following description and from the drawings in which:

FIG. 1 is a plan view, partly in section.
FIG. 2 is a section view along the lines 2—2 of FIG. 1 and showing valve spool in neutral position.
FIG. 3 is a cross section view corrsponding to FIG. 2 but showing the spool in an operating position.
FIG. 4 is a cross section view corresponding to FIG. 2 but of a modified form of the valve with the spool in neutral position.
FIG. 5 is a cross section view showing the modified form with the spool in an operating position.

The invention is herein illustrated in connection with two spool valves but it is applicable to valves with one or any number of spools.

In the form of the invention shown in FIGS. 1, 2, and 3, the control valve includes a valve housing 10 having a pair of valve bores generally indicated as 11 and 12 and extending through the housing 10 from one end to the other. A valve spool 13 is mounted in valve bore 11 and a valve spool 14 is mounted in valve 12.

The valve housing has a supply passage comprising an inlet 16 and a branched passage 17 having branch portions 18 and 19 which intersect valve bore 11. Between the branches there is another passage 20 which intersects valve bore 11 and which in turn has branches 21 and 22 which intersect valve bore 12. Between the branches 21 and 22 there is another passage 23 intersecting valve bore 12 and opening into an exhaust passage 24 which is open to the exterior of the body by means of outlet port 25. The exhaust passage 24 has a pair of branches 26 and 27 which cross both valve bores 11 and 12 and which are dead ended at 28 and 29 respectively.

The valve housing has a pair of cylinder ports 32 and 33 associated with valve bore 11 and spool 13 and has another pair of cylinder ports 34 and 35 which are associated with valve bore 12 and spool 14.

The cross section view through valve bore 11, as shown in FIG. 2, is identical to the corresponding cross section view through valve bore 12 and thus only the cross section along one of the spools is illustrated and described.

As shown in FIG. 2, the valve housing has a counterbore 39 in axial alignment with valve bore 11 and the bottom wall 40 of the counterbore provides an annular valve seat 41 which surrounds the valve bore 11.

Inserted within the counterbore 39 is a sleeve 42 whose inner end 43 is spaced from the seat 41 and which has several projecting lugs 44 angularly spaced thereon for locating a spring 45. The sleeve 42 has a central opening 46 therethrough which forms a portion of the valve bore 11. Transverse openings 47 and 48 through the sleeve connect the valve bore 11 with exhaust branch passage 26 and in effect become a portion of such exhaust passage. Packings 49 and 50 seal the sleeve 42 against the wall of counterbore 39 on opposite sides of exhaust port 26.

The sleeve 42 is retained in a fixed position within counterbore 39 by means of plate 52 fastened to housing 10 by screws 51 having an opening 53 and by means of a tubular member 54 threaded to an extending portion 55 of the sleeve which projects through the opening 53. The tubular member 54 abuts plate 52 and clamps the sleeve 42 thereagainst.

Cylinder port 32 opens into portion 37 of counterbore 39 between the bottom wall 40 and inner face 43 of the sleeve 42 and together with counterbore portion 37 forms a cylinder passage.

The valve housing 10 has another counterbore 60 at its opposite end. This counterbore is also in axial alignment with valve bore 11. The bottom wall 61 of this counterbore provides a valve seat 62 and there is a sleeve 63 for closing the counterbore. The sleeve 63 has an end face 64 spaced from the valve seat 62 and has angularly spaced lugs 65 for supporting and locating a spring 66. The sleeve 63 has a central opening 67 therethrough which forms a portion of the valve bore 11. Cross passages 68 and 69 through the sleeve connect the bore 67 with exhaust passage branch 27. The cross passages 68 and 69 in effect become part of the exhaust passage 27. Packings 69 and 70 seal the sleeve 63 against the wall of counterbore 60 on opposite sides of the exhaust passage branch 27.

Sleeve 63 is retained within counterbore 60 by plate 72 which is attached to the valve housing 10 by means of screws 71. Sleeve 63 may be retained in its position against plate 72 by spring 66, as shown, or it may be threaded upon its exterior surface 74 and secured against plate 72 by a locknut, not shown, threaded onto surface 74 and against the outside face of plate 72.

Cylinder port 33 opens into portion 76 of counterbore 60 between the bottom wall 61 and inner face 64 of sleeve 63 and together with counterbore portion 76 forms a cylinder passage.

Valve spool 13 has a series of lands 78, 79, 80, 81, and 82 formed thereon which are a close fit within the valve bore 11 so as to block flow of fluid through such portions of the valve bore 11 in which the lands may be located in different set positions of the valve spool. The valve spool also has reduced diameter portions between the lands which form spool passages 87, 88, 89, and 90 for conducting fluid between selected passages in the housing in different set positions of the spool.

In the neutral position of the valve spool 13, as shown in FIG. 2, the land 79 extends into sleeve 42 and into the portion of the valve bore 11 between counterbore 39 and supply passage 19. A check valve 93 has a close sliding fit on the land 79 and is normally biased against valve seat 41 by spring 45. Likewise, land 81 extends into bore 67 of sleeve 63 and into the portion of valve bore 11 between counterbore 60 and supply passage branch 18 and there is a check valve 94 having a close slide fit on land 81 and biased against valve seat 62 by spring 66. Spool passage 88 connects supply passage branch 19 with passage 20 and spool passage 89 connects supply passage branch 18 with passage 20 through valve bore 11. Spool 13 is normally maintained in the neutral position shown in FIG. 2 by a centering spring 97.

In the neutral position of spool 13, as shown in FIGS. 1 and 2, fluid from a pump, not shown, enters inlet port 16 and branches into two streams flowing into branch supply passages 18 and 19. From these passages the fluid passes through spool passages 88 and 89 into passage 20 and again divides to enter passages 21 and 22 associated with spool 14. Spool 14 is identical to spool 13 and hence like reference numerals are used to indicate lands and spool passages. Fluid from passages 21 and 22 pass through spool passages 88 and 89 of spool 14 and into passage 23 which is part of the exhaust passage 24. From exhaust passage 24 the fluid is returned to the system reservoir, not shown, through outlet port 25.

As long as both spools 13 and 14 are in neutral position, fluid from the pump passes through the valve in the manner just described and since it circulates freely from the valve inlet to the valve outlet it is at relatively low pressure. During this time, lands 79 and 81 block valve bore 11 on both sides of the cylinder passage portion 37 and land 81 blocks valve bore 11 on both sides of cylinder passage portion 76 to prevent back flow of fluid from the fluid pressure motor to which the cylinder ports 32 and 33 are connected.

When spool 13 is moved leftward to a first operating position, as shown in FIG. 3, land 80 blocks communication between supply passage 19 and passage 20 and land 81 blocks communication between supply passage branch 18 and passage 20 to thus cut off free bypass of fluid through the valve.

At the same time, spool passage 88 and an associated feathering notch 84 in land 79, establishes communication between the supply passage branch 19 and cylinder passage portion 37. Pressure will then build up in the supply passage 17, 18 and 19 and spool passage 88 and when this pressure has exceeded any back pressure within cylinder passage portion 37 due to a load on the fluid pressure motor to be operated, check valve 93 will be unseated and pressure fluid will flow through spool passage 88 and cylinder port 32 to actuate the fluid pressure motor. The check valve 93, by remaining seated until the proper pressure has built up in the supply passages, prevents any back flow of fluid from the fluid pressure motor through cylinder port 32 to the supply passages 19 and 17 and thus prevents dropping of the load on the fluid pressure motor during this interval.

While the spool is in the operating position shown in FIG. 3, spool passage 90 communicates cylinder passage portion 76 with exhaust passages 67, 68, and 27 and fluid from the exhausting side of the fluid pressure motor is returned through such passages to exhaust passage 24 and out through outlet port 25 to the reservoir.

Upon moving spool 13 rightwardly from the neutral position to a second operation position, the flow of fluid through cylinder ports 32 and 33 is reversed. That is, pressure fluid flows from supply passage branch 18 through passage 89 into counterbore 60 where it unseats the check valve 94 upon reaching a pressure higher than in cylinder port 33 and flows through cylinder port 33 to the fluid pressure motor. At the same time, fluid pressure from the other end of the fluid pressure motor returns through cylinder port 32 and spool passage 87 to exhaust ports 47, 48, and 26 to exhaust passage 24 and back to the reservoir through outlet 25.

In the optional form of valve illustrated in FIG. 4, the springs which seat the check valves are also utilized for returning the plunger to neutral position from either operating position when the plunger is released by the operator. In this form, the housing 100 is somewhat elongated. The valve spool 101 has a snap ring 103 mounted within a groove in land 104. A washer 105 has a slide fit on land 104 and in the neutral position of spool 101, as shown in FIG. 4, washer 104 abuts both the snap ring 103 and the end face 106 of sleeve 107 and is held in such abutting engagement by spring 108 which also seats check valve 109 against the bottom of counterbore 110. Sleeve 107 is counterbored as at 111 to receive the snap ring 103 when the spool 101 is moved in that direction.

At the other end of spool 101, land 114 likewise has a snap ring 113 mounted in a groove therein and washer 115 is slideable on land 114 and is held into abutting engagement with snap ring 113 and end face 116 of sleeve 117 by spring 118 when the valve spool is in neutral position. The spring 118 also acts to seat check valve 119 in the bottom of counterbore 120.

When valve spool 101 is moved to the left, as shown in FIG. 5, to a first operating position, snap ring 103 moves into counterbore 111 but washer 106 remains in place against end face 106 and spring 108 exerts no force upon the valve spool in one direction or the other. However, at the other end of the spool, snap ring 113 has moved washer 115 toward check valve 119 to compress spring 118. The spring 118 thus acts on spool 101 through washer 115 and snap ring 113 to return the valve spool to the neutral position of FIG. 4 when the spool is released by the operator.

When the valve spool is moved in the opposite direction from the neutral position to a second operating position, the snap ring 113 moves into counterbore 121 but washer 115 remains in position against end face 116 of sleeve 117. At the other end of the plunger, snap ring 103 moves washer 105 toward check valve 109, thus compressing spring 108 and this spring acts through washer 105 and snap ring 103 to urge the valve spool toward the neutral position.

It is obvious that many changes in detail construction may be made without departing from the scope of the invention as defined in the claims.

I claim:

1. A valve comprising a housing having a bore and having supply, exhaust, and cylinder passages intersecting the bore at spaced points, a valve spool slidable in said bore, said spool having a land blocking the bore between the supply and cylinder passages when the spool is in a neutral position and having a first spool passage for connecting the supply and cylinder passages when the spool is in a first operating position, an annular valve seat in said cylinder passage surrounding said bore and of greater diameter than said bore, a check valve slidably mounted on said spool, means biasing said check valve and normally holding said check valve against said seat for closing off communication between said first spool passage and said cylinder passage when the spool is in said first operating position, said check valve being free of abutting engagement with said spool in all positions of said spool and being movable away from said seat solely by fluid pressure within said spool passage to open such communication when the fluid pressure within the first spool passage exceeds pressure of fluid within the cylinder passage.

2. A valve in accordance with claim 1 in which said land also blocks the bore between said cylinder passage and said exhaust passage when the spool is in said first operating position.

3. A valve in accordance with claim 1 in which said land also blocks the bore between said cylinder and exhaust passages when the spool is in said neutral position.

4. A valve in accordance with claim 1 in which said check valve is slidably mounted on said land.

5. A valve in accordance with claim 1 in which said spool has a second spool passage and a second operating position in which said second spool passage connects said cylinder passage to said exhaust passage and said land blocks said bore between the cylinder and supply passages to cut off communication therebetween, said biasing means also acting on said spool for urging the same toward said neutral position when said spool is in said second operating position.

6. A valve in accordance with claim 1 in which said spool has a second spool passage and a second operating position in which said spool passage connects said cylinder passage to said exhaust passage and said land blocks said bore between the cylinder and supply passages to cut off communication therebetween, an abutment means fixed on said spool and said biasing means acts on said abutment means for urging the spool toward said neutral position when said spool is in said second operating position.

7. A valve in accordance with claim 1 in which said spool has a second spool passage and a second operating position in which said second spool passage connects said cylinder passage to said exhaust passage and said land blocks said bore between the cylinder and supply passages to cut off communication therebetween, a snap ring fixed on said land spaced from said check valve, and said biasing means comprises a spring interposed between said snap ring and said check valve and which is compressed therebetween when said spool is in said second operating position whereby to urge said spool toward said neutral position.

8. A valve in accordance with claim 1 in which said spool has a second spool passage and a second operatng position in which said second spool passage connects said cylinder passage to said exhaust passage and said land blocks said bore between the cylinder and supply passages to cut off communication therebetween, a first abutment means fixed on said spool and engages said biasing means for compressing the same when the spool is moved to said second operating position whereby the biasing means urges said spool toward said neutral position from said second operating position, and a second abutment means is fixed in said housing and engages said biasing means to prevent distension of the same when said spool is moved to said first operating position.

9. A valve housing having a bore and a counterbore, a sleeve mounted in said counterbore and having a central opening therethrough which together with said bore constitutes a valve bore, said housing containing a supply passage, a cylinder passage which includes a portion of said counterbore, and an exhaust passage which includes a transverse opening in said sleeve, said passages intersecting the valve bore at spaced points, a valve spool slidable in said valve bore between a neutral portion and first and second operating positions, said spool having land positions blocking the valve bore between said passages when the spool is in neutral position, said spool having a first spool passage for connecting the supply and cylinder passages when the spool is in said first operating position and having a second spool passage for connecting the cylinder and exhaust passages when the spool is in said second operating position, an annular valve seat in said cylinder passage surrounding said bore, a check valve slidably mounted on one of said land portions, a spring normally biasing said check valve against said seat for closing off communication between said first spool passage and said cylinder passage when the spool is in said first operating position, and said check valve being movable away from said seat by fluid pressure within said first spool passage to open such communication when the fluid pressure within the spool passage exceeds the pressure of fluid within the cylinder passage.

10. A valve in accordance with claim 9 in which a first abutment means is fixed on said spool and engages said spring for compressing the same when the spool is moved to said second operating position whereby the spring urges said spool toward said neutral position from said second operating position, said sleeve engaging said spring to prevent distension of the same when said spool is moved to said first operating position.

11. A valve in accordance with claim 9 in which said sleeve is sealed with respect to said counterbore on opposite sides of said transverse opening.

12. A valve in accordance with claim 9 in which there is a means on said spool within said central opening for blocking flow of fluid through said opening in all positions of said spool.

13. A valve in accordance with claim 12 in which said means comprises another land and a packing ring associated therewith.

14. A valve in accordance with claim 9 in which said sleeve extends part way into said counterbore and said check valve is within said counterbore between said sleeve and the bottom of said counterbore.

15. A valve in accordance with claim 9 in which said sleeve is mounted in a fixed position within said counterbore and there is a spring between said sleeve and said check valve for biasing the check valve toward said seat.

16. A valve in accordance with claim 9 in which said counterbore is closed by a plate secured to the housing and overlying a portion of said sleeve to retain the same within said counterbore, said sleeve having a threaded extension passing through said plate, and a member threaded to said extension and abutting said plate for fixing said sleeve against inward movement within said counterbore.

17. A valve in accordance with claim 9 in which a plate is secured to the housing and said sleeve is clamped to said plate for fixing its axial position within said counterbore.

18. A valve comprising a housing having a bore and having supply passage means intersecting said bore, said housing also having two sets of cylinder and exhaust passages, one set intersecting the bore at spaced points on one side of the supply passage means and the other set intersecting the bore at spaced points on the other side of the supply passage means, a valve spool slidable in said bore from a neutral position to either of two operating positions, said spool having a land associated with each set of cylinder and exhaust passages and blocking the bore therebetween when the spool is in said neutral position, said spool having spool passages adjacent each end of said lands for selectively connecting said cylinder, supply and exhaust passages in said operating positions of said spool, an annular valve seat in each cylinder passage surrounding said bore, a check valve slidablby mounted on each of said lands, one check valve being associated with each of said seats, a spring associated with each check valve and normally biasing the same against its seat for closing off communication between the respective spool and cylinder passages when the spool is in an operating position for establishing such communication, said check valves being movable away from said seats by fluid pressure within said spool passages to open such communication when the fluid pressure within the respective spool passage exceeds pressure of fluid within the respective cylinder passage, abutment means on the spool engaging the springs for compressing one spring or the other when said spool is moved to one operating position or the other whereby one spring or the other acts on said spool urging it toward said neutral position from said operating positions.

References Cited in the file of this patent
UNITED STATES PATENTS

| | | |
|---|---|---|
| 2,482,249 | Court | Sept. 20, 1949 |
| 2,503,827 | Langmore et al. | Apr. 11, 1950 |
| 2,505,527 | Court | Apr. 25, 1950 |
| 2,600,702 | Stephens | June 17, 1952 |
| 2,830,561 | Lindstrom | Apr. 15, 1958 |